United States Patent Office 3,355,488
Patented Nov. 28, 1967

3,355,488
CALCIUM CHLORIDE SALT OF PENICILLAMINE
Albert Robert Restivo, Belleville, and Frank A. Dondzila, East Brunswick, N.J., assignors, by mesne assignments, to E. R. Squibb & Sons, Inc., New York, N.Y., a corporation of Delaware
No Drawing. Filed Apr. 13, 1964, Ser. No. 359,479
1 Claim. (Cl. 260—534)

This invention relates to a new salt of penicillamine. More particularly, the invention relates to the calcium chloride salt of D-penicillamine (β-mercaptovaline), i.e.

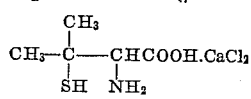

It has been found that calcium chloride is unique and differs from other metal halides such as aluminum chloride, zinc chloride, magnesium chloride and the like, in that it forms a neutral crystalline monomolecular salt with D-penicillamine in which one mole of calcium chloride is joined to one mole of D-penicillamine. It is produced by reacting D-penicillamine (the free acid form) with an excess of calcium chloride (about 1:2) in aqueous medium, preferably with heating at about 50° to 60° C.

D-penicillamine is useful as a metal scavenger, i.e., for the removal of metal ions. It is believed to function as a complexing agent or chelating agent. It is useful in therapy, e.g., in hepatolenticular degeneration or lead poisoning. The calcium chloride salt of D-penicillamine is a crystalline substance which is useful in the same manner as D-penicillamine itself but offers advantages. In one particular aspect, the physical properties of the calcium chloride salt make it easier and more convenient to handle and work with. For example, the calcium chloride salt is not corrosive to equipment as D-penicillamine in some forms. Tableting is also facilitated. The calcium chloride salt of D-penicillamine may be administered orally, e.g., in tablets or capsules at dosages of about 500 mg.

The following examples illustrate the invention.

Example 1

To a 50° C. solution of 14.9 g. (0.1 m.) of D-penicillamine (free acid) in 100 cc. of water, is added with agitation over a period of 10 minutes, a 60° C. solution of 22.18 g. (0.2 m.) CaCl₂ in 45 cc. of water. After a holding period of two hours at room temperature, the mother liquor is concentrated to dryness under vacuum on a rotary flash evaporator. The residue is extracted with 75 cc. of absolute alcohol and the extract filtered from a small amount of insolubles. To the extract at room temperature, under efficient agitation, is added isopropyl acetate until a permanent cloudiness is formed. The mixture is then agitated for two hours at room temperature and finally at 0–5° C. for two hours to complete the precipitation. The product, the calcium chloride salt of D-penicillamine (1:1) is then filtered, washed with isopropyl acetate and dried overnight at 55° C. in a circulating air drier, M.P. 300° C.

Analysis.—Calculated for $C_5H_{11}NO_2S \cdot CaCl_2 \cdot 2H_2O$: C, 20.28; H, 5.11; N, 4.73; Cl, 23.90; Ca, 13.50. Found: C, 20.44; H, 5.10; N, 4.48; Cl, 23.46; Ca, 13.47.

Example 2

Tablets are prepared from the following ingredients:

| | gm. |
|---|---|
| D-penicillamine, calcium chloride salt | 250 |
| Stearic acid lubricant | 7 |
| Polyvinylpyrrolidone | 10.5 |
| Avicel (microcrystalline cellulose) | 82.5 |

The calcium chloride salt of D-penicillamine is granulated with the polyvinylpyrrolidone. The Avicel and lubricant are then added. The mixture is then tableted in conventional manner on a tablet punch to obtain 500 tablets of 700 mg. each, containing 500 mg. of active ingredient.

What is claimed is:
Calcium chloride salt of D-penicillamine.

References Cited
UNITED STATES PATENTS 2,477,149  7/1949  Sheehan et al. _____ 260—534
2,974,136  3/1961  Nielson _____ 167—65

OTHER REFERENCES

Foreman: "Federal Proceedings," vol. 20, No. 3, Part II, Supplement 10 (1961) pp. 191–196.
Greenstein et al.: Chemistry of Amino Acids, volume 1, John Wiley & Sons, New York (1961), pp. 666–672.
Martin et al.: Remington's Practice of Pharmacy, 12th edition, Mack Publishing Co., Easton, Pennsylvania (1961), pp. 778–779.

LORRAINE A. WEINBERGER, Primary Examiner.
A. P. HALLUIN, Assistant Examiner.